(No Model.)
I. KITSEE.
SECONDARY BATTERY.
No. 406,916. Patented July 16, 1889.
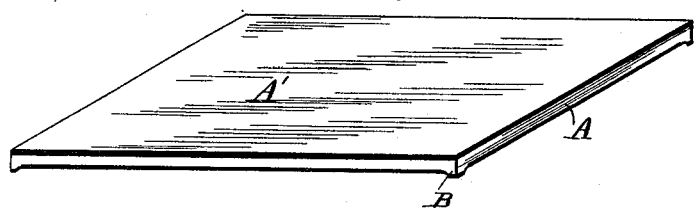
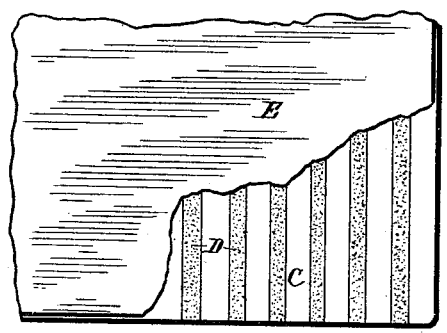 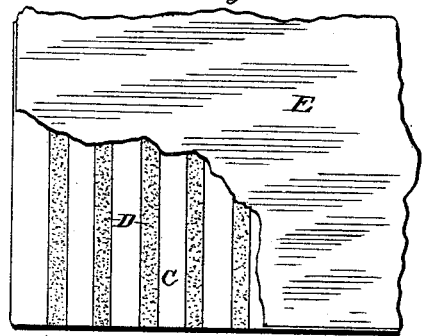
 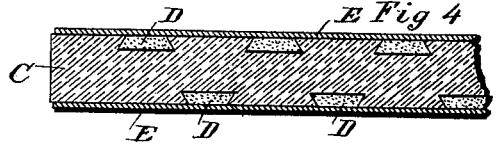
 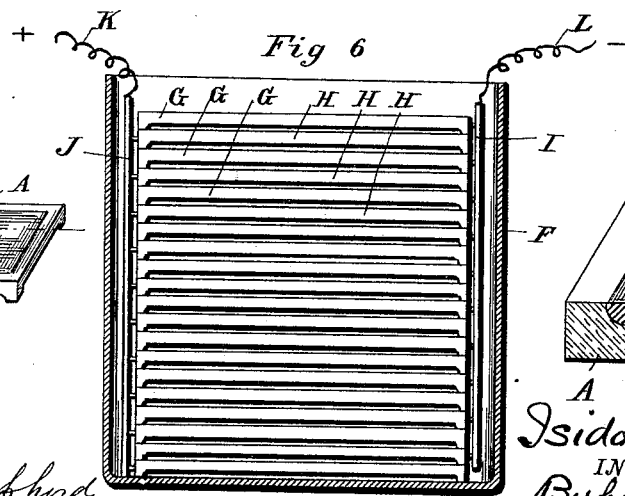 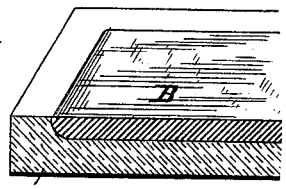
WITNESSES
P. B. Shepherd.
J. Norman Dixon.
Isidor Kitsee,
INVENTOR
By his Attorneys,
Wm. C. Strawbridge
J. Bonsall Taylor

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

SECONDARY BATTERY.

SPECIFICATION forming part of Letters Patent No. 406,916, dated July 16, 1889.

Application filed May 10, 1888. Renewed March 1, 1889. Serial No. 301,727. (No model.)

*To all whom it may concern:*

Be it known that I, ISIDOR KITSEE, a citizen of the United States, residing at Cincinnati, in the State of Ohio, have invented certain new and useful Improvements in Secondary Batteries, of which the following is a specification.

My invention relates to secondary batteries the elements or electrodes of which are of lead or of other equivalent material possessing for the same use similar properties.

As is well known, the continued use of a secondary battery in which the electrodes are, for instance, of lead, causes the electrodes to eventually become unduly brittle, so that jarring will occasion their disintegration, and also renders them liable to warp, with the result of the separation from their surfaces of the spongy red lead formed upon or applied to them. As a consequence of these conditions it has been heretofore necessary to place the plates at a considerable distance apart or to make the plates of great thickness whereby the cost of constructing as well as of maintaining the battery was increased.

As is further well known the storage capacity of the lead plates is with the employment of a given quantity of lead in proportion to the surface area exposed to the electrolyte; and as a result, the greater the surface area of the electrode in proportion to the amount of metal of which it is composed, the greater will be the volume of electric energy which said electrode will be capable of retaining and therefore of giving out.

It is also well known that the resistance which the battery liquid of a secondary battery offers to the passage of the current between its electrodes or plates, diminishes with the decrease of the space or interval between the negative and positive electrodes, and that, as a consequence, the greater the surface of the plates and the nearer they are placed together, the greater the electric energy that can be stored in the battery and the smaller the resistance of said battery and therefore the smaller the loss of the current.

To the end of rendering practically available the foregoing well known characteristic conditions under which batteries of this class can be made most serviceable, my invention has for its object, first, the making of an electrode possessing the largest possible surface area with a given quantity of electrode material; and, second, the making of an electrode in which the lead or electrode material, that is to say, the element proper is formed in connection and combined with a supporting member, base, plate, or back, formed of porous material such as is used in the manufacture of porous cups in electric batteries, or formed of other suitable porous material unsusceptible to electrolysis, with the advantageous result that the warping of the lead plate during the operation of forming or in the use of the battery is prevented and the placing or stacking of the plates in the battery rendered possible.

In order to carry out the foregoing objects recourse may be had to various cognate constructions, those which I especially prefer being depicted in the accompanying drawings which illustrate various embodiments of my invention.

In the accompanying drawings, Figure 1 is a view in perspective of an electrode embodying my improvements. Figs. 2 and 3 are, respectively, a magnified longitudinal sectional elevational detail, and a partially fragmentary plan view of a modified form of electrode also embodying my invention. Figs. 4 and 5 are views, respectively similar to Figs. 2 and 3, of another modified construction of electrode embodying my invention. Fig. 6 is an end elevational view of a battery composed of a stack of electrodes of the character represented in Fig. 1, the battery box being in section and the electrodes in edge elevation. Fig. 7 is a view of a form of electrode constituted by a plate, the upper face of which is dished to receive the lead, and Fig. 8 is a cross-section of the same.

In the electrode represented in Fig. 1, A is a supporting plate or base formed of porous material such, for instance, as is used in the manufacture of the porous cups of electric batteries.

Upon one of its surfaces, in the drawings the upper surface, this base is provided with a layer or plate A' of lead, or other suitable electrode material, being the element proper. The base is also at its corners formed or provided with downwardly extending projections B, which may be termed toes, which permit of the stacking or superimposing of a series of these electrodes one upon the other in the manner represented in Fig. 6, and at the same time permit of the access of the electrolyte between said electrodes. The layer of lead A' may be applied to and connected with the supporting plate or base in any preferred manner.

In the electrode represented in Figs. 2 and 3, the porous base designated C is upon one of its faces, namely its lower face, transversely channeled with a series of preferably dove-tailed grooves which are filled with red oxide of lead, or other "active" material D, and to the upper surface of the base when its channels are thus filled the lead plate E or layer of electrode material is applied.

In the electrode of Figs. 4 and 5, the supporting plate C is made of greater thickness than is the plate of the electrode of Figs. 2 and 3, and is channeled upon both its surfaces or faces with dove-tailed grooves, preferably disposed in alteration or staggered relationship as shown in Fig. 4, the said grooves being all filled with red oxide of lead or other "active" material D, and a layer of lead E is applied to both surfaces of the base after its channels have been filled.

In both of the constructions shown respectively in Figs. 2 and 3 and 4 and 5, the electrolyte or battery fluid acts not only upon the outer surface or surfaces of the layer of lead, but also through the porous supporting base upon the back surface or surfaces of said layers and upon the contained red oxide of lead or other "active" material within the grooves. This action of the electrolyte is facilitated by the fact that the under surface of the supporting base of Figs. 2 and 3 is always exposed to its action, while the edges of said base in the electrode of Figs. 4 and 5 are similarly exposed.

In the electrode shown in Figs. 7 and 8 the porous supporting-plate A at its upper side, is made concave and this concavity contains red lead or other "active" material B.

In Fig. 6 is represented a secondary battery containing electrodes of the construction represented in Fig. 1, the adjacent ends of the positive electrodes, which are designated by the letter H, being connected with a conducting plate J, while the adjacent ends of the negative electrodes, which alternate with the positive and are designated by the letter G, are connected with a similar conducting plate I. The electrodes in this battery are contained within a box or vessel F, and the conducting plates are provided with the usual conducting wires which are respectively designated K and L.

The term element employed in this specification and in the claims, is used to indicate the layer of lead or other metallic electrode material therein referred to.

Having thus described my invention, I claim:—

1. An electrode for a secondary battery consisting of a supporting plate formed of a porous material and provided upon one or more of its surfaces with a layer of a suitable element substance, substantially as specified.

2. An electrode for a secondary battery consisting of a supporting plate formed of a porous and stiff substance unsusceptible to electrolysis and provided upon one or more of its surfaces with a layer of a suitable element substance, substantially as specified.

3. An electrode for a secondary battery consisting of a supporting plate formed of a porous substance unsusceptible to electrolysis provided as to parts of its surface with red lead or with other "active" material, and also provided with an exterior layer of lead or of other suitable element substance, substantially as specified.

4. An electrode for a secondary battery consisting of a supporting plate formed of a porous substance unsusceptible to electrolysis, provided as to one or more of its surfaces with a series of grooves or cavities containing red lead or other active material, and also provided with an outer layer of lead or other suitable element substance, substantially as specified.

5. In a secondary battery, in combination, a containing box or vessel, a series of electrodes each consisting of a supporting plate of porous material provided with a layer of a suitable element substance, metallic conducting plates each, at the respective ends of the said electrodes, in contact with the adjacent ends of each alternate electrode of the said series, and conducting wires respectively attached to each of said conducting plates, substantially as specified.

In testimony that I claim the foregoing as my invention I have hereunto signed my name this 1st day of May, A. D. 1888.

ISIDOR KITSEE.

In presence of—
 J. BONSALL TAYLOR,
 F. NORMAN DIXON.